June 9, 1931. T. F. THOMPSON 1,809,608
SEMIAUTOMATIC TRANSMISSION
Filed Sept. 11, 1930 3 Sheets-Sheet 1

Inventor
—Theo.-F.-Thompson—

By *M. Talbert Dick*
Attorney

June 9, 1931. T. F. THOMPSON 1,809,608
SEMIAUTOMATIC TRANSMISSION
Filed Sept. 11, 1930   3 Sheets-Sheet 2

Inventor
—Theo. F. Thompson—

By M. Talbert Dick
Attorney

June 9, 1931. T. F. THOMPSON 1,809,608
SEMIAUTOMATIC TRANSMISSION
Filed Sept. 11, 1930   3 Sheets-Sheet 3

Inventor
Theo. F. Thompson
By M. Talbert Dick
Attorney

Patented June 9, 1931

1,809,608

UNITED STATES PATENT OFFICE

THEODORE F. THOMPSON, OF FORT DODGE, IOWA

SEMIAUTOMATIC TRANSMISSION

Application filed September 11, 1930. Serial No. 481,316.

The principal object of my invention is to provide a transmission for automotive vehicles and the like that will automatically go into high gear from low gear when a predetermined speed or load pull is attained without any act on the part of the operator of the vehicle and will automatically return to a low gear when the speed or load pull drops to a speed or load pull below the predetermined speed or load pull for high gear.

A further object of this invention is to provide a semi-automatic transmission for vehicles that delivers a continuous uninterrupted power while the transmission is progressing from low to high gear and from high gear to low gear.

A still further object of this invention is to eliminate the necessity of disengaging the clutch by the operator of the vehicle when the transmission goes from low gear to high gear or from high gear to low gear.

A still further object of this invention is to provie a semi-automatic transmission that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Figure 1:
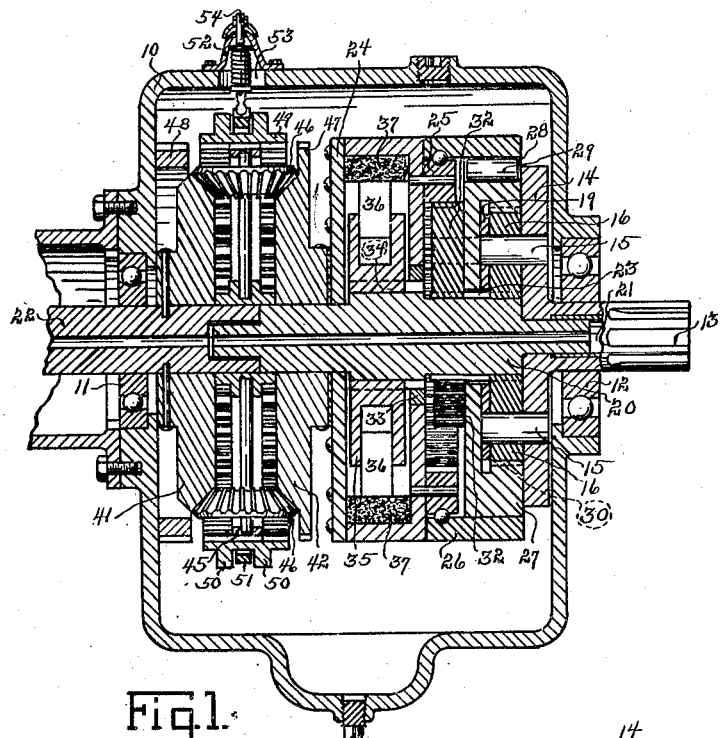
Fig. 1 is a side sectional view of my complete invention ready for use.
Figure 3:
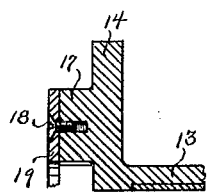
Fig. 3 is a sectional view of a portion of the front end of the third driving shaft and illustrates the holding of a shield over the four idler gears which are secured to the same.

The transmissions now being used on automotive vehicles such as automobiles, trucks and the like require that the same be manually operated from low to a higher gear and from a higher gear to a lower gear. During this manual operation the clutch must be disengaged and this means that no power is being transmitted during the operation from the prime mover of the vehicle to the traction wheels of the vehicle. This means that we have to depend upon the rolling momentum of the car while the clutch is disengaged and the gear shifting is being done. In hilly country this condition is not only undesirable but very serious and many accidents are caused thereby. This is also true in congested traffic when both hands of the vehicle operator are being used either to guide the vehicle or to signal a stop or turn. My semiautomatic transmission overcomes all of these disadvantages as will hereinafter be disclosed.

I have used the numeral 10 to designate the complete housing in which my invention operates and in which is suitable transmission oil or grease. Secured on the front and rear ends of the housing 10 are two bearing members 11 and 12, positioned diametrically opposite from each other. Rotatably mounted in the bearing member 12 and extending into the housing 10 is the third driving shaft 13.

Figure 2:
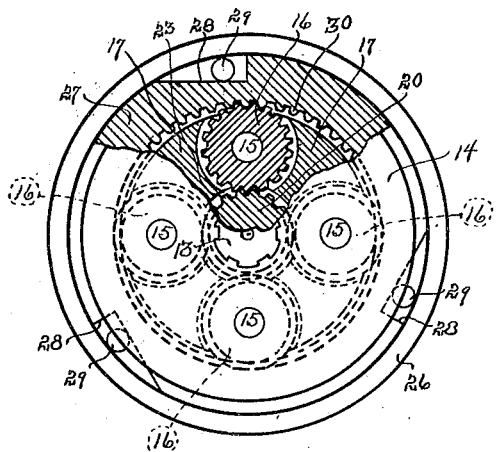
Fig. 2 is a cross sectional view of my invention showing the rear side of the clutch and driving mechanism.
Figure 4:
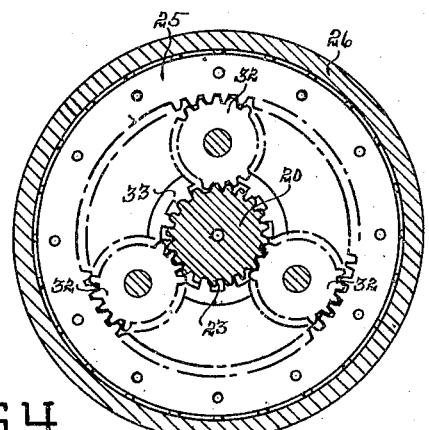
Fig. 4 is still another cross sectional view of my invention and shows the three idler gears that engage the second driving shaft and governor housing.
Figure 5:
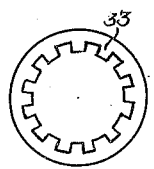
Fig. 5 is a rear view of the small filler ring mounted on the second driving shaft.

This shaft is designed to be in operative communication with the traction wheels of the vehicle. Integrally formed on the front end of the shaft 13 and inside the housing 10 is a plate 14. This plate carries four equally spaced apart axles 15 rotatably mounted on each of which is a small spur gear 16, as shown in Fig. 1 and Fig. 2. Integrally formed on the plate 14 and extending between the spur gears 16 are space filling members 17. Secured by screws 18 to these filling members 17 is a ring plate 19 inclosing the front sides of the spur gears 16.

The numeral 20 designates the second driving shaft of the invention having its rear end reduced and entering a bore 21 in the front end of the driving shaft 13. By this arrangement the driving shaft 20 may have independent rotation relative to the driving shaft 13. The numeral 22 designates the first driving shaft rotatably mounted in the bearing member 11 and extending into the front end of the housing 10. This driving shaft 22 embraces the front reduced end of the driving shaft 20, and, therefore, may possess independent rotation relative to the driving shaft 20. It is this driving shaft 22 that is designed to be in operative connection with the prime mover of the vehicle.

I have used the numeral 23 to designate spur gear teeth formed on the periphery of the rear end portion of the driving shaft 20 and are in engagement with the four spur gears 16, as shown in Fig. 1. The numeral 24 designates the cylindrical governor housing rotatably mounted on the central portion of the driving shaft 20. Secured on the rear side of the housing 24 is an internal ring gear 25. Rotatably mounted around the outside of this ring gear 25 is the internal brake housing 26 extending a considerable distance rearward of the ring gear 25 and rigidly secured to the housing 10 by suitable means.

Rotatably mounted in the rearward portion of the housing 26 is the brake plate 27 having notches 28 formed in its periphery. Each of these notches have one of their sides extending approximately in a radial line and their other sides extending at an angle from the extreme bottom of the notches to the periphery of the plate 27, as shown in Fig. 2. Loosely mounted in each of the notches 28 is a wedge roller 29. By this arrangement when the brake plate 27 is rotated to the left, the members 29 will tend to move to the right in the notches 28 and by so doing will wedge tightly between the internal clutch brake housing 26 and the clutch plate 27, thereby preventing further independent rotation of the clutch plate 27 with the housing 26.

On the other hand when the brake plate 27 is moved to the right relative to the housing 26, the rollers 29 will tend to move to the left in the notches 28 and by so doing will not wedge between the plate 27 and the housing 26, thereby permitting easy independent rotation of the plate 27 to the brake housing 26. It should here be noted that the brake plate 27 has an internal ring gear 30 near its outer portion, which engages the four spur gears 16 at points diametrically opposite of the points where these spur gears engage the teeth 23 of the shaft 20. The brake plate 27 embraces the driving shaft 20 but does not engage the shaft 20. Rotatably mounted on the forward face of the brake plate 27 are three spur gears 32 of a diameter the same as the diameter of the spur gears 16. These three spur gears 32 are in engagement with the internal ring gear 25 and also in engagement with the extended teeth 23 of the second driving shaft 20. The numeral 33 designates a space filling gear ring on the driving shaft 20 and between the shaft 20 and the rear side of the governor housing that embraces that shaft.

Figure 6:
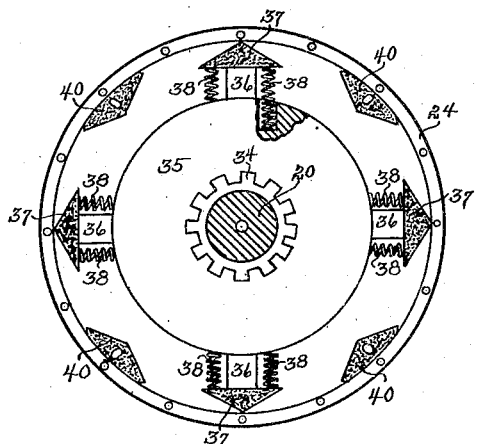
Fig. 6 is another cross sectional view of the invention and shows a rear side view of the governor mechanism of the invention.
Figure 7:
Fig. 7 is a rear view of one of the fiber fixed lugs of the governor used in the invention.

Inside the governor housing and on the periphery of the shaft 20 are teeth 34. On the shaft 20, engaging these teeth and inside the governor housing 24 is the wheel 35. The numeral 36 designates four square posts slidably mounted in the periphery of the wheel 35 and extending radially from the shaft 20. The numeral 37 designates pointed shoe heads preferably of composition fiber. These pointed shoe heads are yieldingly held adjacent the inside of the governor housing, as shown in Fig. 6, by each having two coil springs 38 engaging them and the wheel 35, as shown in Fig. 6. The numeral 39 designates four equally spaced apart rods in the governor housing 24. These rods 39 are parallel with and a slight distance from the inside periphery of the cylindrical governor housing 24.

Figure 8:
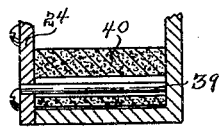
Fig. 8 is a side sectional view of one of the fiber fixed lugs and illustrates the manner of anchoring the same inside the governor housing.

The numeral 40 designates a lug loosely embracing each of the rods 39 and are preferably of a fiber composition similar to the heads 37. These lugs 40 are thickest near their centers and have each of their ends turned a slight distance away from the inside periphery of the governor housing. By this construction, and due to the fact that they are loosely mounted on the rods 39 as shown in Fig. 8, oil may enter and is encouraged to enter between the lugs 40 and the inside periphery of the housing 24 to give a cushioning effect when the lugs 40 are engaged by the shoe heads 37. The lugs 40 should be of such length however as to prevent their complete rotation on the rods 39. By this last described mechanism, when the shaft 20 is rotated at sufficient speed the shoe heads 37 will move outwardly by centrifugal force and engage the lugs 40 with such power as to prevent independent rotation of the shaft 20 and the governor housing 24. Thus far I have considered the mechanism for automatically changing from low to high gear and high to low gear.

Figure 9:
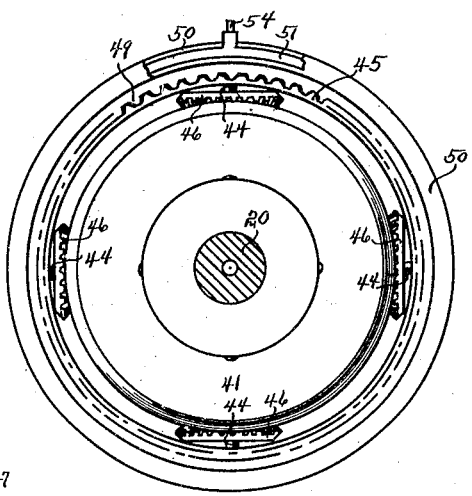
Fig. 9 is another cross sectional view of the invention and shows the front side of the mechanism for producing "neutral" and "forward" and "reverse" speeds.
Figure 10:
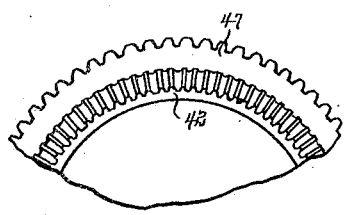
Fig. 10 is a portion of the front side of one of the large gears used in the part of the invention illustrated in Fig. 9.
Figure 11:
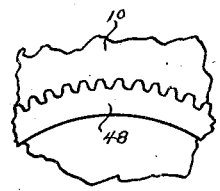
Fig. 11 is a rear view of a portion of the ring gear rigidly fixed to the transmission housing.
Figure 12:
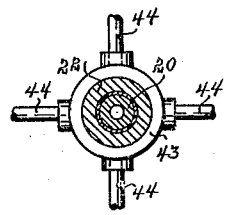
Fig. 12 is a rear side view of a portion of the invention that supports the small bevel gears used in the portion of the invention illustrated in Fig. 9.

I will now consider the portion of the mechanism that gives forward and reverse speeds and "neutral". The numeral 41 designates a large bevel gear rigidly secured on the first driving shaft 22 and inside the housing 10. Directly opposite from this gear 41 and rigidly secured to the shaft 20 near its forward end is a similar large bevel gear 42. These two bevel gears face each other and are spaced apart one from the other. Rotatably mounted on the shafts 20 and 22 and between the large bevel gears 41 and 42 is a sleeve 43. The numeral 44 designates four spokes equally spaced apart and extending from the sleeve 43. The numeral 45 designates an external ring gear secured to the outer ends of the spokes 44, as shown in Fig. 1 and Fig. 9. Inside the ring gear 45 and rotatably mounted on each of the spokes 44 is a small bevel gear 46. Each of these small bevel gears engage the two large bevel gears 41 and 42 at points diametrically opposite from each other, as shown in Fig. 1. The numeral 47 designates an external ring gear integrally formed on the periphery of the bevel gear 42. The numeral 48 designates an external ring gear integrally formed on the front inside wall of the housing 10. It should here be noted that the external ring gears 45, 47 and 48 are approximately of the same diameter and are only spaced slightly apart from each other, as shown in Fig. 1. The numeral 49 designates an internal ring gear engaging the external ring gear 45 and of a width much greater than the width of the ring gear 45. Integrally formed on the outside periphery of the ring gear 49 are two parallel spaced apart flanges 50. The numeral 51 designates a circular fork loosely embracing the upper portion of the ring gear 49 between the two flanges 50. The numeral 52 designates a covering dome over an opening 53 in the top of the housing 10. Supported by the dome 52 and extending into the housing 10 through the opening 53 is the usual hand operated lever 54 having its lower end secured to the fork 51.

By this arrangement when the hand operated lever forces the ring gear 49 to the front end of the housing 10, the ring gear 49 will be engaging the ring gear 45 and the ring gear 48, thereby preventing any rotation of the ring gear 45 by locking the same to the transmission housing 10. When the hand lever 54 forces the ring gear 49 toward the rear end of the housing 10, the ring gear 49 will be in engagement with the ring gear 45 and the ring gear 47, thereby preventing further independent rotation of the ring gear 45 and the bevel gear 42. When the hand operated lever 54 is in a vertical position, the ring gear 49 will only be in engagement with the ring gear 45 and the transmission will be in a condition generally known as "neutral".

The operation of the invention is as follows: If the motor of the vehicle is functioning the first driving shaft 22 which is operatively connected to the same will be rotated. As the large bevel gear 41 is rigidly secured to the shaft 22 this bevel gear will be rotating at all times, which will in turn rotate the small bevel gears 46. These bevel gears are also in mesh with the large bevel gear 42 which is similar to the bevel gear 41 and is rigidly secured to the second driving shaft 20. However as the second driving shaft 20 is operatively connected to the other mechanism of the invention and to the traction wheels of the vehicle its tendency will be to remain stationary and in turn hold the bevel gear 42 stationary. With the bevel gear 42 held stationary the small bevel gears 46 will travel around the bevel gear 42 which is made possible by the small bevel gears 46 being supported by the member 43 rotatably mounted on the shafts 22 and 20. When all of the gears are in this arrangement and which is shown in Fig. 1, the transmission will be in what is known as "neutral".

To cause the invention to go into "forward gear" the manually operated control rod 54 is pushed forward which will move the fork 51 toward the rear end of the housing 10. This action, as we have seen will cause the internal ring gear 49 to move over and engage the external ring gear 47 formed on the bevel gear 42, thereby locking the external ring gear 45 and the bevel gear 42 against independent rotation. This means that the small bevel gears 46 are locked against any rotation and the shaft 22 and second shaft 20 will rotate in the same direction and with each other and to the right. As this shaft 20 has just started to be rotated or as long as it is rotating slowly the shoe heads 37 will not be thrown out by centrifugal force with very great power to engage the fiber lugs 40 and will, therefore, slip by the lugs 40 without rigidly connecting the wheel 35 secured to the shaft 20 to the governor housing 24.

This governor housing 24 will be rotating in the opposite direction or to the left. The reason for this is that the three spur gears 32 which are operatively connected to the shaft 20 are also operatively connected to the internal ring gear 25, which is secured to the governor housing. This action must take place as the brake plate 27 is prevented from rotating to the left for the reasons I have heretofore described and the small spur gears 32 will be prevented from rotating around the shaft 20, it being remembered that the brake housing 26 is always prevented from any rotation by being secured to the housing 10. The slowly rotating shaft 20 will also rotate the four spur gears 16 which are in engagement with it. These spur gears are also in engagement with the internal brake plate 27 which is rigidly secured against any movement to the left during this action.

As the brake plate 27 cannot rotate the small spur gears 16 must each travel completely around the second driving shaft 20 and as they are secured to the plate 14 which is a part of the third driving shaft 13, the driving shaft 13 will be slowly rotated to the right and in the same direction of rotation as the direction of rotation of the shaft 22, but due to the reduction gears will rotate at a much less speed than the shaft 22 and "low gear" will result. The ratio of rotation of the shafts 22 and 13, when in "low gear" will depend upon the relative sizes and dimensions of the various reduction gears used.

As soon as the shaft 20 is rotated at sufficient speed to cause the members 37 to securely engage the lugs 40 by centrifugal force, the governor housing 24 will be prevented from rotation in the opposite direction to the shaft 20 and will thereafter rotate in the same direction and with the shaft 20. By this action the spur gears 32 will gradually slow up and be locked and will rotate with the shaft 20. As the spur gears 32 move with the shaft 20 they will also carry with them the brake plate 27 to which they are rotatably mounted. As the brake plate 27 only attaches itself to the clutch housing 26 when rotating to the left, it may easily rotate with the shaft 20 and to the right. As the four spur gears 16 are in engagement with both the brake plate 27 and the shaft 20 they cannot rotate but must also travel around and with the second driving shaft 20 and as they are secured to the shaft 13, the shaft 13 will rotate in the same direction and with the shafts 20 and 22 and at the same speed of rotation as the shaft 22, and "high gear" will result. However, when the vehicle speed is sufficiently reduced, or the load pull becomes too great and the members 37 do not properly lock the governor housing 24 against rotation relative to the shaft 20, the spur gears 32 will not be locked to the shaft 20, and the third driving shaft 13 will automatically be rotated in "low gear".

To place the invention in "reverse gear" it is merely necessary to move the operating rod 54 backwardly which will cause the internal ring gear to engage the ring gears 48 and 45. By the ring gear 48 being prevented from rotation relative to the housing 10, the ring gear 45 will also be prevented from rotation. As the bevel gear 41 is rotating with the motor to the right it will in turn rotate the now stationary held bevel gears 46. By these bevel gears 46 being in mesh also with the large bevel gear 42, the bevel gear 42 will be rotated in an opposite direction to the direction of rotation of the shaft 22. By the bevel gear 42 being rigidly secured to the shaft 20, the shaft 20 will also rotate in the opposite direction, and "reverse gear" will result. The reason for the rotation of the shaft 13 in a reverse direction is due to a yielding drag that always exists by virtue of the governor and continues to increase with the increased speed rotation of the governor. The reason for this is that the sprocket gears 32 will be rotated to the right by the shaft 20 and as they cannot circle the shaft 20 to the left, due to the brake, their tendency will be to cause the governor housing 24 to rotate to the right. However, the rotation of the governor housing 24 to the right will be yieldingly prevented by the centrifugal action of the members 37 and their force will increase with the speed of rotation of the shaft 20. This action will cause the sprocket gears 32 to tend to remain stationary relative to their circling of the shaft 20. With the tendency of the member 27 thus to be held stationary, the shaft 13 will be rotated in the same direction as the shaft 20. As a matter of fact the action of my transmission will be similar in both reverse and forward gears, in that certain relative gears will result as distinguished from extreme "high gear" and extreme "low gear".

Although I have described my invention as particularly adaptable to automotive vehicles such as automobiles, trucks and the like, it may be used to equal advantage with other types of machinery requiring a transmission.

Some changes may be made in the construction and arrangement of my improved semi-automatic transmission, without departing from the real spirit and purpose of my invention, and it is my intention to cover by my claims any modified forms of structure or use of mechanical equivalents which may be reasonably included within their scope.

I claim:

1. In a device of the class described, a shaft designed to have one of its ends operatively connected to a prime mover, a second shaft capable of being operatively connected to said first mentioned shaft at times, an internal ring gear embracing said second shaft and of a diameter much greater than the diameter of the said second shaft, gear teeth on said second shaft, a governor on said second shaft capable of locking said ring gear against independent rotation relative to said second shaft when a certain speed or lack of load pull of said shaft is realized, a spur gear engaging said internal ring gear and said teeth at points diametrically opposite from each other, a third shaft, a brake having a fixed portion and a movable portion; said movable portion capable of engaging and being locked against movement when rotated in one direction, a shaft secured to the movable portion of said brake for rotatably securing said spur gear to said movable portion, an internal ring gear secured to said movable portion, a plate secured to said third shaft, and a spur gear rotatably mounted on said plate having its teeth engaging said movable portion and teeth on said second shaft at points diametrically opposite from each other.

2. In a device of the class described, a shaft designed to have one of its ends operatively connected to a prime mover, an internal ring gear embracing said shaft and of a diameter much greater than the diameter of said shaft, gear teeth on said shaft, a governor for locking said ring gear against independent rotation relative to said shaft when a certain speed of or lack of load pull on said shaft is realized, a second shaft, a brake having a fixed portion and a movable portion, a spur gear rotatably mounted to said movable portion having its teeth engaging said ring gear and the teeth on said first mentioned shaft at points diametrically opposite from each other, internal gear teeth on said movable portion, a plate secured to said second shaft, and a spur gear rotatably mounted on said plate having its teeth engaging the teeth on said movable portion and the teeth on said first mentioned shaft at points diametrically opposite from each other.

3. In a device of the class described, a shaft designed to have one of its ends operatively connected to a prime mover, a ring gear, teeth on the periphery of said shaft, a governor for locking said ring gear against independent rotation relative to said shaft when a certain speed of or lack of load pull on said shaft is realized, a second shaft, a brake having a fixed portion and a movable portion, a plurality of spur gears rotatably mounted to said movable portion each having their teeth engaging said ring gear and said first mentioned shaft at points diametrically opposite from each other, internal gear teeth on said movable portion, a plate secured to said second shaft, and a plurality of spur gears rotatably mounted on said plate each having their teeth engaging the teeth on said movable portion and the teeth on said first mentioned shaft at points diametrically opposite from each other.

4. In a device of the class described, a shaft designed to have one of its ends operatively connected to a prime mover, an internal ring gear embracing said shaft and of a diameter much greater than the diameter of said shaft, gear teeth on said shaft, a governor for locking said ring gear against independent rotation relative to said shaft when a certain speed of or lack of load pull on said shaft is realized, a second shaft, a brake having a fixed portion and a movable portion, a plurality of equally spaced apart spur gears rotatably mounted to said movable portion each having their teeth engaging said ring gear and the teeth on said first mentioned shaft at points diametrically opposite from each other, gear teeth on said movable portion, a plate secured to said second shaft, and a plurality of equally spaced apart spur gears rotatably mounted on said plate each having their teeth engaging the teeth on said movable portion and the teeth on said first mentioned shaft at points diametrically opposite from each other.

5. In a device of the class described, a shaft designed to have one of its ends operatively connected to a prime mover, an internal ring gear embracing said shaft and of a diameter much greater than the diameter of of said shaft, gear teeth on said shaft, a governor for locking said ring gear against independent rotation relative to said shaft when a certain speed of or lack of load pull on said shaft is realized, a second shaft, a brake having a fixed portion and a movable portion; said movable portion capable of engaging said fixed portion and being locked against movement when rotated in one direction, a plurality of equally spaced apart spur gears rotatably mounted to said movable portion each having their teeth engaging said ring gear and the teeth on said first mentioned shaft at points diametrically opposite from each other, gear teeth on said movable portion, a plate secured to said second shaft, and a plurality of equally spaced apart spur gears rotatably mounted on said plate each having their teeth engaging the teeth on said movable portion and the teeth on said first mentioned shaft at points diametrically opposite from each other.

6. In a device of the class described, a shaft designed to have one of its ends operatively connected to a prime mover, a rotatably mounted internal ring gear embracing said shaft, gear teeth on said shaft, a governor for locking said ring gear against independent rotation relative to said shaft when a certain speed of or lack of load pull on said shaft is realized, a second shaft, a brake having a fixed portion and a movable portion, a spur gear rotatably mounted to said movable portion having its teeth engaging said ring gear and the teeth on said first mentioned shaft at points diametrically opposite from each other, internal gear teeth on said movable portion, a plate secured to said second shaft, and a spur gear rotatably mounted on said plate having its teeth engaging the teeth on said movable portion and the teeth on said first mentioned shaft at points diametrically opposite from each other.

7. In a device of the class described, a shaft designed to have one of its ends operatively connected to a prime mover, a rotatably mounted ring gear embracing said shaft, gear teeth on said shaft, a centrifugal force operated governor operatively connected to said shaft capable of locking said ring gear against independent rotation relative to said shaft when a certain speed of or lack of load pull on said shaft is realized, a second shaft in the same plane as said first mentioned shaft, a plate member formed on said second shaft and adjacent one end portion of said first shaft, a brake loosely embracing said first shaft having a fixed portion and a movable portion; said movable portion capable of engaging said fixed portion and being locked against independent movement when rotated in one direction, a plurality of spur gears rotatably mounted on said movable portion having their teeth engaging said ring gear and the teeth on said first shaft, an internal ring gear on said movable portion, and a plurality of spur gears rotatably mounted to said plate having their teeth engaging the teeth of said ring gear and the teeth on said first shaft.

8. In a device of the class described, a shaft designed to have one of its ends operatively connected to a prime mover, a ring gear embracing said shaft, a governor for locking said ring gear against independent rotation relative to said shaft when a certain speed of or lack of load pull on said shaft is realized, a second shaft, a brake having a fixed portion and a movable portion, a plurality of spur gears rotatably mounted to said movable portion, each being in operative engagement with said ring gear and said first mentioned shaft, a plate secured to said second shaft, and a plurality of gears rotatably mounted on said plate each being operatively connected to said movable portion and said first mentioned shaft.

THEODORE F. THOMPSON.